(12) United States Patent
Wherley et al.

(10) Patent No.: US 9,955,636 B2
(45) Date of Patent: May 1, 2018

(54) METHOD AND SYSTEM FOR REDUCTION OF IRRIGATION RUNOFF

(71) Applicant: The Texas A&M University System, College Station, TX (US)

(72) Inventors: Benjamin G. Wherley, College Station, TX (US); Jorge Luis Alvarado, College Station, TX (US); Richard H. White, College Station, TX (US); James C. Thomas, Bryan, TX (US); Junfeng Men, Plymouth, MI (US); Dean Evan Tate, Annapolis, MD (US); Fouad H. Jaber, Richardson, TX (US); William C. Reynolds, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days. days.

(21) Appl. No.: 15/215,239

(22) Filed: Jul. 20, 2016

(65) Prior Publication Data

US 2017/0020088 A1 Jan. 26, 2017

Related U.S. Application Data

(60) Provisional application No. 62/195,055, filed on Jul. 21, 2015.

(51) Int. Cl.
*E02B 11/00* (2006.01)
*A01G 25/16* (2006.01)
*A01G 25/06* (2006.01)

(52) U.S. Cl.
CPC .............. *A01G 25/16* (2013.01); *A01G 25/06* (2013.01); *Y02A 40/282* (2018.01)

(58) Field of Classification Search
CPC ....................................................... E02B 11/00
USPC ............. 405/37; 137/624.11, 624.18; 239/70
See application file for complete search history.

(56) References Cited

U.S. PATENT DOCUMENTS

| 5,251,153 | A  |   | 10/1993 | Nielsen et al. |            |
|-----------|----|---|---------|----------------|------------|
| 5,445,178 | A  | * | 8/1995  | Feuer          | A01G 25/167 |
|           |    |   |         |                | 137/1      |
| 5,944,444 | A  | * | 8/1999  | Motz           | E01C 13/083 |
|           |    |   |         |                | 137/561 R  |
| 6,652,188 | B1 | * | 11/2003 | Albright       | A01G 25/167 |
|           |    |   |         |                | 405/37     |
| 8,606,415 | B1 | * | 12/2013 | Woytowitz      | A01G 25/167 |
|           |    |   |         |                | 239/69     |

(Continued)

OTHER PUBLICATIONS

Arnold et al; "Water advance model and sensor system can reduce tail runoff in irrigated alfalfa fields"; California Agriculture; vol. 68, No. 3; Jul.-Sep. 2014; http://ucanr.edu/repository/CAO/landingpage.cfm?article=ca.v068n03p82&fulltext=yes.*

(Continued)

*Primary Examiner* — Benjamin F Fiorello
*Assistant Examiner* — Edwin J Toledo-Duran
(74) *Attorney, Agent, or Firm* — Winstead PC

(57) ABSTRACT

An irrigation mitigation runoff system that includes an irrigation system having at least one water outlet and a sensor that detects flow of water through a boundary. A controller is operatively coupled to the irrigation system and the sensor. Responsive to the sensor detecting flow of water through the boundary above a pre-defined threshold, the controller signals the irrigation system to pause irrigation.

17 Claims, 10 Drawing Sheets

(56) References Cited

U.S. PATENT DOCUMENTS

| | | | | |
|---|---|---|---|---|
| 2004/0144432 A1* | 7/2004 | Schafer | ............... | A01G 25/16 137/624.18 |
| 2005/0082382 A1* | 4/2005 | Evelyn-Veere | ...... | A01G 25/167 239/63 |
| 2006/0002763 A1* | 1/2006 | Schafer | ............... | E02B 11/00 405/43 |
| 2011/0174706 A1* | 7/2011 | Russell | ............... | A01G 25/00 210/170.01 |
| 2014/0371928 A1 | 12/2014 | Ersavas et al. | | |
| 2015/0051743 A1* | 2/2015 | Darnold | ............... | A01G 25/16 700/284 |
| 2016/0161310 A1* | 6/2016 | Leaders | ............... | G01F 1/663 702/48 |

OTHER PUBLICATIONS

Dukes, Michael D. et al; "Smart Irrigation Controllers: How Do Soil Moisture Sensor (SMS) Irrigation Controllers Work?"; University of Florida, IFAS Extension; original publication Oct. 2008, revised Feb. 2015; 5 pages.

* cited by examiner

| Test Date | Sensor Type | Scheduled Irrigation Time[1] (mins) | Pause Time[2] (mins) | Start Time[3] (hr:min) | Allowable Irrigation Window[4] (hrs) | Effective Irrigation Time[5] (mins) | LIRMS Total Operation Time[6] (hr:mins) |
|---|---|---|---|---|---|---|---|
| 9.17.15 | Conductivity | 30 | 20 | 8:00 am | 6 | 23 | 5:26 |
| 9.19.15 | Conductivity | 30 | 10 | 7:50 am | 8 | 15 | 6:15 |
| 9.21.15 | Conductivity | 30 | 10 | 7:20 am | 6 | 30 | 5:30 |
| 9.29.15 | Float | 30 | 10 | 6:00 am | 8 | 30 | 5:30 |
| 3.25.16 | Float | 30 | 60 | 1:00 am | 8 | 15 | 7:16 |
| 4.8.16 | Float | 30 | 60 | 1:00 am | 8 | 30 | 3:30 |
| 4.15.16 | Float | 30 | 60 | 1:00 am | 8 | 25 | 7:25 |
| 4.22.16 | Float | 30 | 60 | 1:00 am | 8 | 23 | 7:24 |
| 5.6.16 | Float | 30 | 60 | 1:00 am | 8 | 30 | 4:30 |
| 5.13.16 | Float | 30 | 60 | 1:00 am | 8 | 30 | 5:31 |
| 5.20.16 | Float | 30 | 120 | 1:00 am | 8 | 13 | 6:14 |

FIG. 6

| Test Date | IRRIGATION VOLUME[1] | | WATER SAVINGS FROM LIRMS[2] (gal) | RUNOFF VOLUME[3] | | RUNOFF REDUCTION BY LIRMS[4] (%) | SOIL MOISTURE[5] | | SOIL WETTING EFFICIENCY INDEX[6] | |
|---|---|---|---|---|---|---|---|---|---|---|
| | LIRMS (gal) | CONTROL (gal) | | LIRMS (gal) | CONTROL (gal) | | LIRMS Pre/Post (%) | CONTROL Pre/Post (%) | LIRMS | CONTROL |
| 9.17.15 | 217 | 229 | -- | 27 | 53 | 46 | -- | -- | -- | -- |
| 9.19.15 | 242 | 231 | -- | 50 | 84 | 37 | -- | -- | -- | -- |
| 9.21.15 | 237 | 231 | -- | 52 | 88 | 43 | -- | -- | -- | -- |
| 9.29.15 | 241 | 223 | -- | 50 | 83 | 44 | -- | -- | -- | -- |
| *Average* | *234* | *229* | -- | *45* | *77* | *43* | -- | -- | -- | -- |
| 3.25.16 | 137 | 234 | 97 | 45 | 103 | 56 | 42.0/ 45.9 | 41.6/ 44.5 | 6.9 | 3.0 |
| 4.8.16 | 240 | 225 | -- | 22 | 26 | 13 | 20.2/ 46.7 | 24.6/ 40.7 | 50.6 | 29.1 |
| 4.15.16 | 207 | 231 | 24 | 87 | 97 | 11 | 30.4/ 46.5 | 32.8/ 44.4 | 25.7 | 15.3 |
| 4.22.16 | 200 | 229 | 29 | 83 | 124 | 33 | 44.2/ 46.5 | 44.7/ 46.3 | 2.6 | 1.6 |
| 5.6.16 | 250 | 227 | -- | 49 | 63 | 23 | 26.1/ 41.2 | 27.5/ 41.0 | 23.1 | 21.8 |
| 5.13.16 | 245 | 212 | -- | 45 | 62 | 27 | 24.6/ 40.2 | 29.5/ 39.5 | 26.0 | 16.0 |
| 5.20.16 | 120 | 239 | 119 | 52 | 116 | 51 | 48.2/ 56.5 | 50.3/ 56.2 | 14.3 | 4.9 |
| *Average* | *200* | *228* | *38* | *55* | *84* | *31* | *33.7/ 46.2* | *35.8/ 44.7* | *21.3* | *13.1* |

FIG. 7

METHOD AND SYSTEM FOR REDUCTION OF IRRIGATION RUNOFF

This application claims priority to, and incorporates by reference the entire disclosure of, U.S. Provisional Patent Application No. 62/195,055, filed on Jul. 21, 2015.

BACKGROUND

Field of the Invention

The present application relates generally to irrigation systems and more particularly, but not by way of limitation, to systems and methods for reducing runoff associated with such irrigation systems.

History of the Related Art

As irrigation water supplies become strained, conservation of irrigation water has become very important to municipalities as well as water utilities. Currently, the only feedback control systems for automated irrigation systems are based on soil moisture sensors, weather-based evapotranspiration (ET) controllers, or rain sensors. Soil moisture sensors adjust irrigation based on a moisture content of soil at a particular depth. Weather-based ET controllers adjust irrigation times based on local environmental conditions. Likewise, rain sensors prevent irrigation during rainfall. Such controllers lack the ability to control irrigation when irrigation water is applied at a faster rate than can be absorbed by the soil. Some irrigation controllers allow manual programming of cycle soak times; however, these controllers typically only accommodate three cycles and require substantial guesswork in programming. Consequently, a need exists for an irrigation controller that automatically adjusts irrigation operation and/or run times based on detected irrigation-water runoff.

SUMMARY

The present invention relates generally to irrigation systems and more particularly, but not by way of limitation, to systems and methods for reducing runoff associated with such irrigation systems. In one aspect, the present invention relates to an irrigation runoff mitigation system that includes an irrigation system having at least one water outlet and a sensor that detects flow of water through a boundary. A controller is operatively coupled to the irrigation system and the sensor. Responsive to the sensor detecting flow of water through the boundary above a pre-defined threshold, the controller signals the irrigation system to pause irrigation.

In another aspect, the present invention relates to a method for mitigating irrigation that includes applying irrigation water to a region via at least one water outlet and detecting runoff of irrigation water through a boundary of the region. Responsive to the detected runoff being above a pre-defined threshold, the application of irrigation water is paused. Responsive to the detected runoff being below the pre-defined threshold, the application of irrigation water is resumed.

BRIEF DESCRIPTION OF THE DRAWINGS

For a more complete understanding of the present invention and for further objects and advantages thereof, reference may now be had to the following description taken in conjunction with the accompanying drawings in which:

FIG. 6 is a table describing testing of the irrigation runoff mitigation system of FIG. 1A according to an exemplary embodiment; and FIG. 7 is a table describing results of testing of the irrigation runoff mitigation system of FIG. 1A according to an exemplary embodiment.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1A:
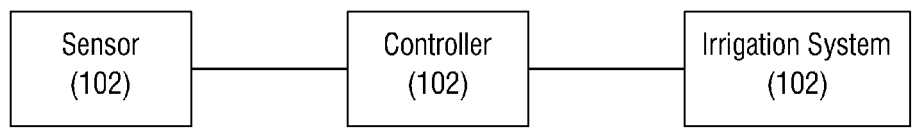
FIG. 1A is a block diagram of an irrigation runoff mitigation system according to an exemplary embodiment.
Figure 1B:
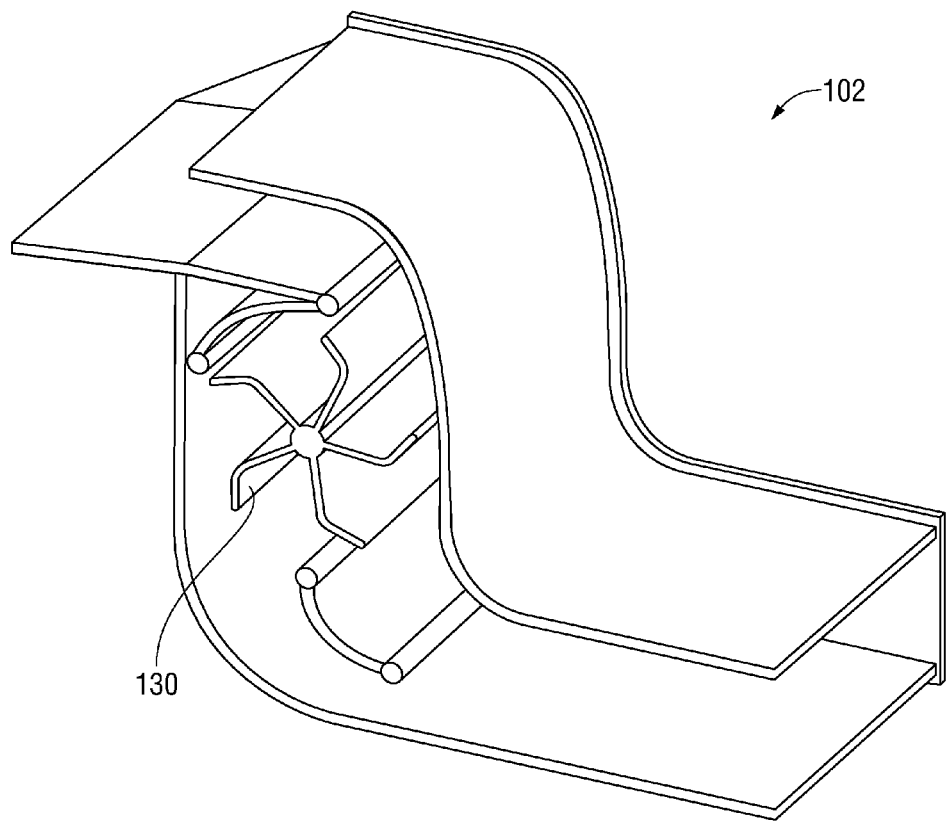
FIG. 1B is a cross sectional view of a paddle-wheel sensor according to an exemplary embodiment.
Figure 1C:
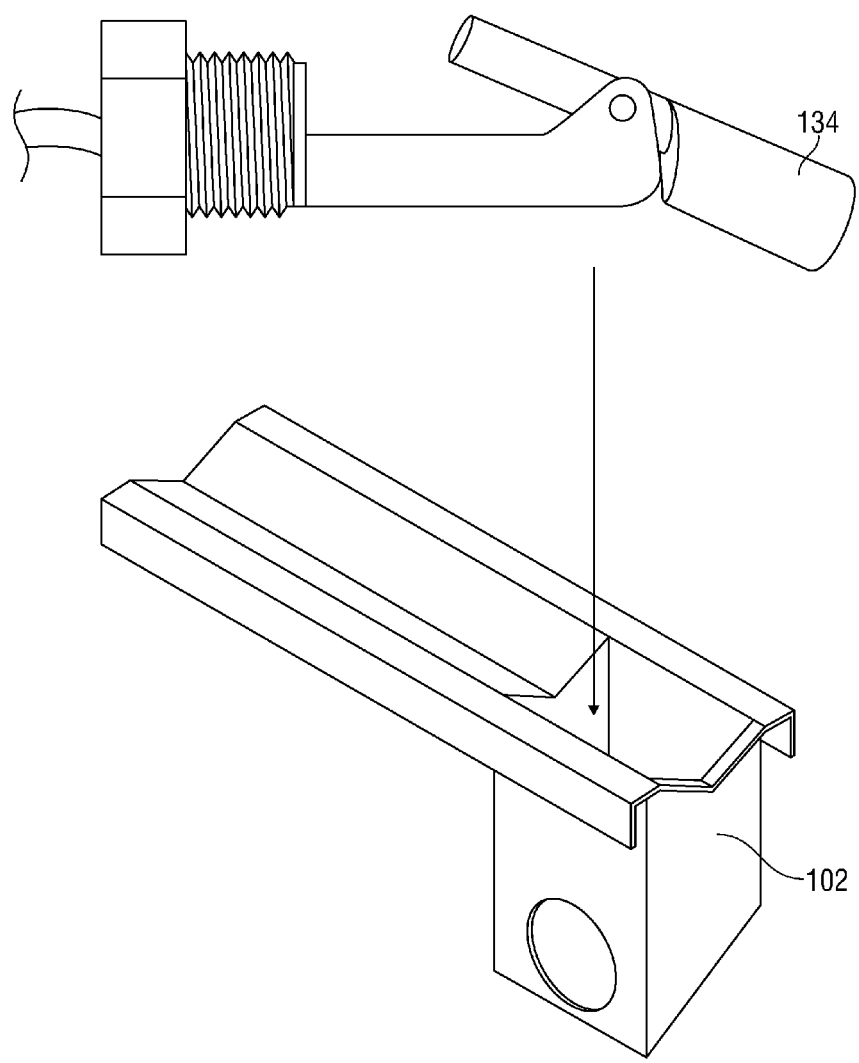
FIG. 1C is an exploded view of a float sensor according to an exemplary embodiment.

FIG. 1A is a block diagram of an irrigation runoff mitigation system 100. The irrigation runoff mitigation system 100 includes a sensor 102, an irrigation system 104, and a controller 106 that is electrically coupled to the sensor 102 and the irrigation system 104. In a typical embodiment, the sensor 102 detects a quantity of water flowing through a boundary of an irrigation zone. In a typical embodiment, the irrigation zone is, for example, residential landscaping and the boundary is, for example, a street or a curb. In other embodiments, the boundary may be, for example, a boundary between two adjacent residential yards. In still other embodiments, the boundary may be a property boundary such as, for example, a golf course, an athletic field, commercial landscaping, or municipal landscaping. In still other embodiments, the boundary may be, for example, a drain line underlying an irrigation region such as, for example, a golf green. In a typical embodiment, the sensor 102 detects a flow rate of water passing through the boundary. In various embodiments, the flow rate is either a mass flow rate or a volumetric flow rate as dictated by design requirements. As shown in FIG. 1B, in various embodiments, the sensor 102 may be for example, a paddle-wheel sensor where a rotational speed of a paddlewheel 130 is measured to determine a flow rate of fluid therethrough. As shown in FIG. 1C, in various other embodiments, the sensor 102 may be a float sensor where a differential between an entering flow rate and a known exiting flow rate causes a vertical position of a float 132 to vary. In various other embodiments, the sensor 102 may be, for example, a conductance sensor or any other appropriate sensor as dictated by design requirements. In a typical embodiment, the sensor 102 is sized to fit into a section of curb that is, for example 6 inches tall, 6 inches deep, and 12 inches long.

Figure 3A:
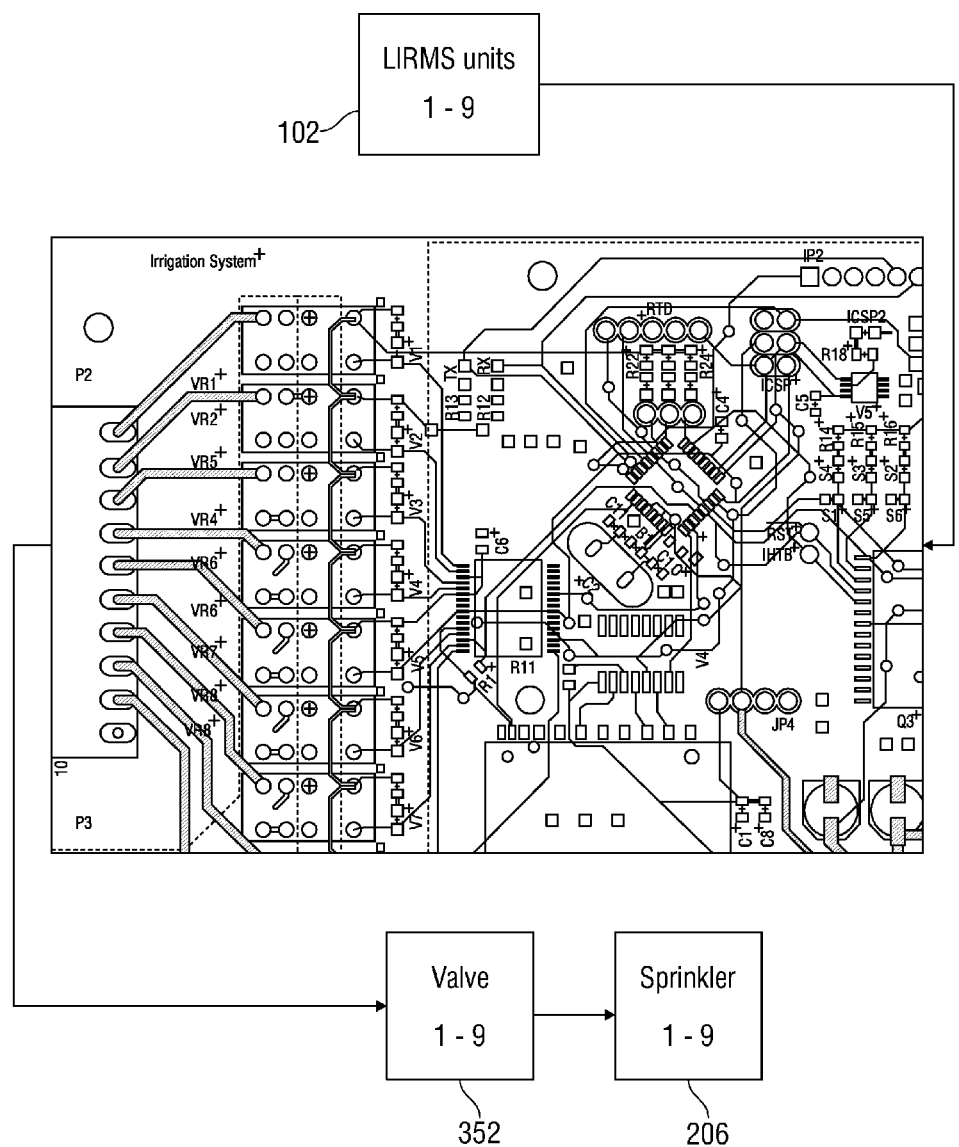
FIG. 3A is a block diagram of a stand-alone irrigation runoff mitigation system according to an exemplary embodiment.
Figure 3B:
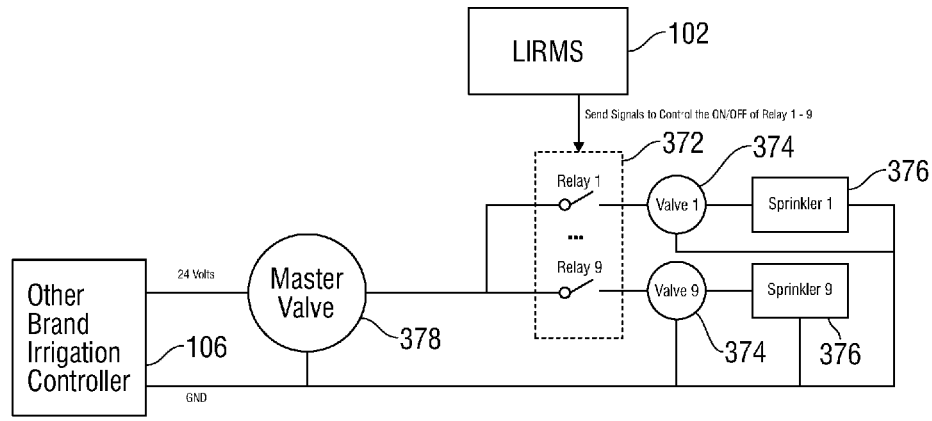
FIG. 3B is a block diagram of an add-on irrigation runoff mitigation system according to an exemplary embodiment.

Still referring to FIG. 1A, the sensor 102 communicates with the controller 106 via, for example, a wireless connection or a hard-wired connection. In a typical embodiment, the controller 106 controls operation of the irrigation system 104. In various embodiments, the controller 106 is powered via, for example, battery or solar power. In other embodiments, the controller 106 is wired to, for example, a residential electrical supply. As shown in FIGS. 3A-3B, in other embodiments, the irrigation runoff mitigation system 100 can be used independent of an existing irrigation system controller. In such an embodiment, the sensor 102 controls the runoff mitigation system 100 independent of the existing irrigation controller.

Figure 2A:
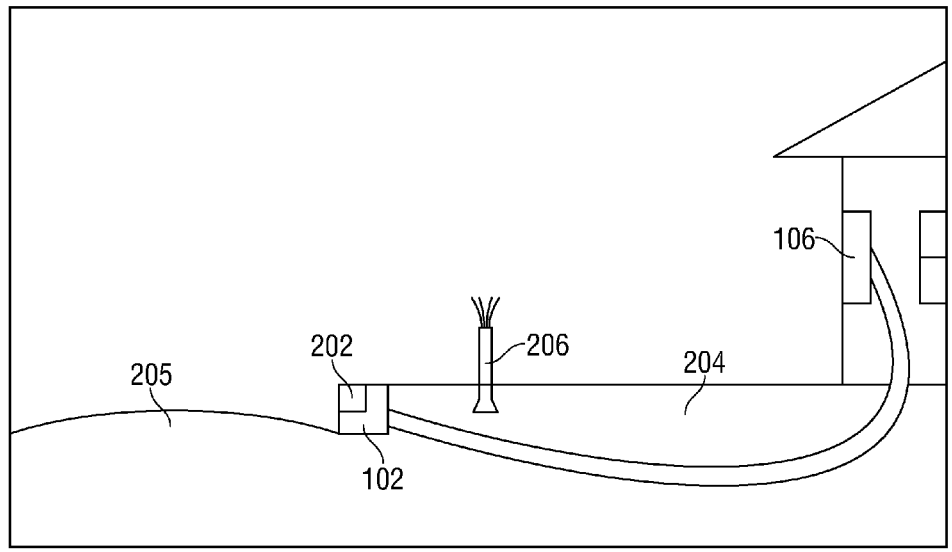
FIG. 2A is a diagrammatic illustration of the system of FIG. 1A installed in a curb according to an exemplary embodiment.

FIG. 2A is a diagrammatic illustration of an embodiment of the irrigation runoff mitigation system 100. In the embodiment shown in FIG. 2A, the sensor 102 is cut into, for example, a curb 202, which curb 202 separates a residential yard 204 from a street 205. In a typical embodiment, the sensor 102 is installed at a point of lowest elevation of the curb 202. In various embodiments, a trench or drain is utilized to divert runoff water from the yard 204 towards the sensor 102. Still referring to FIG. 2A, the irrigation system 104 comprises at least one water outlet 206. During operation, the at least one water outlet 206 discharges irrigation water onto the yard 204.

Figure 2B:
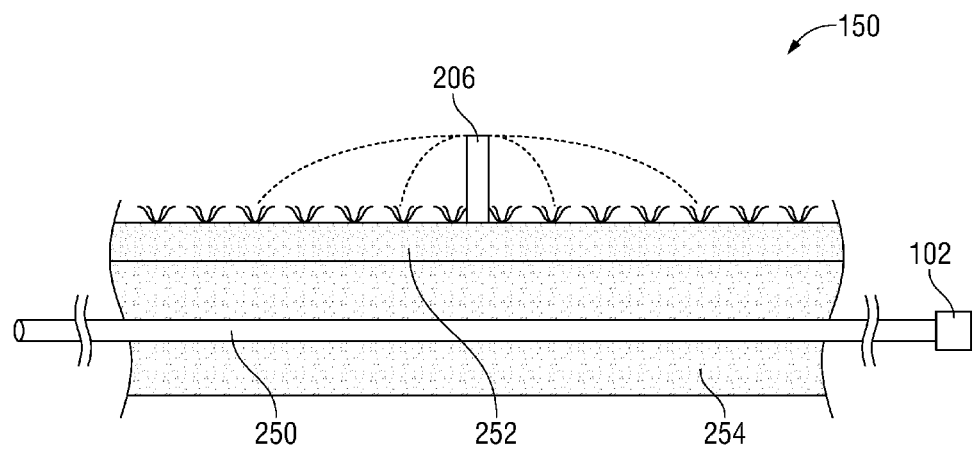
FIG. 2B is a diagrammatic illustration of the system of FIG. 1A installed in a drain underlying an irrigation region according to an exemplary embodiment.

FIG. 2B is a diagrammatic illustration of an embodiment of the irrigation runoff mitigation system 150 installed in a drain line 250. In the embodiment shown in FIG. 2B, the sensor 102 is disposed in a drain line 250 underlying underlying an irrigation zone 252 such as, for example, a golf green. In a typical embodiment, the irrigation zone 252 may be disposed over a porous substrate 254 such as, for example, sand. The drain line 250 thus captures water that leaches through the irrigation zone 252 into the substrate 254. By utilizing the sensor 102 in the drain line 250, the irrigation runoff mitigation system 150 can adjust irrigation times to prevent application of excessive water to the irrigation zone 252. Additionally, the irrigation system 150 can be utilized, for example, during flushing of golf greens in order to determine when an adequate amount of water has been applied to the irrigation zone 252 to flush, for example, salts, from the golf green.

FIG. 3A is a block diagram of a stand-alone irrigation runoff mitigation system. As shown in FIG. 3A, the sensor 102 is electrically connected to the controller 106 of the irrigation system 104. The controller 106, in turn, is electrically connected to a valve 352 and a water outlet 206 such as, for example, a sprinkler. In a typical embodiment, a sensor 102 is associated with each zone defined by the controller 106; however, in other embodiments, a single sensor 102 may control the irrigation system 104 in its entirety. In a typical embodiment, the controller 106 may control any number of zones from 1 zone to "n" zones, where "n" could be, for example, nine or more zones.

FIG. 3B is a block diagram of an add-on irrigation runoff mitigation system 370. The sensor 102 is electrically coupled to relay 372 that controls a valve 374 for a sprinkler 376. As shown in FIG. 3B, the irrigation runoff mitigation system 370 includes two sprinklers 376 and two valves 374; however in other embodiments, any number of valves and sprinklers could be utilized. In various embodiments, the runoff mitigation system 370 could control nine zones or more. The valve 374 is fluidly coupled to a master valve 378. The master valve 378 and the valve 376 are electrically coupled to the controller 106. During operation, when excess runoff is detected by the sensor, the sensor 102 signals the relay 372 to cut off electric current to one or more valves 374. Removal of electrical current induces the valve 374 to close and turn off the sprinkler 376.

Figure 3C:
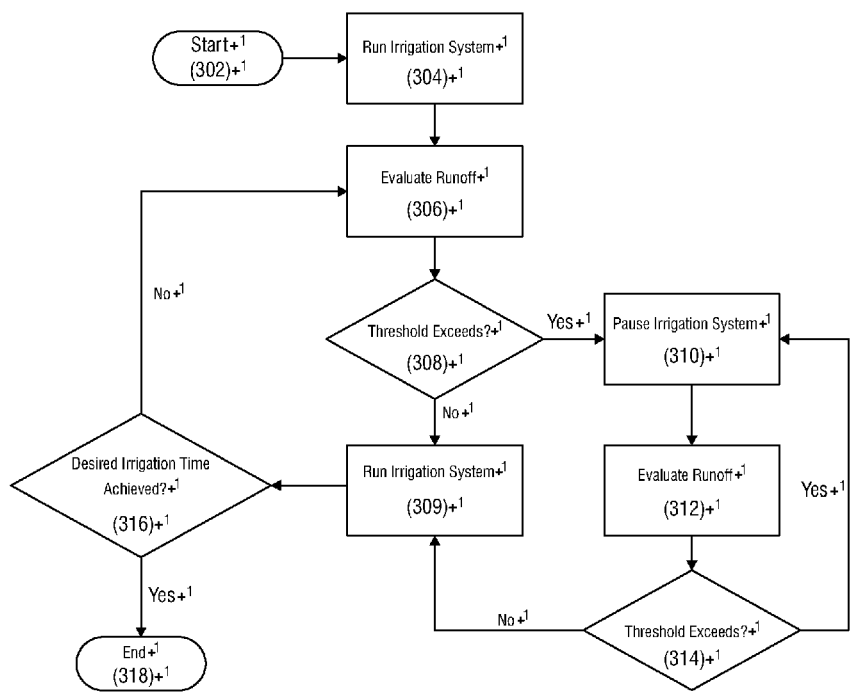
FIG. 3C is a flow diagram illustrating a method for mitigating irrigation runoff according to an exemplary embodiment.

FIG. 3C is a flow diagram of a process 300 for reducing irrigation runoff. The process 300 starts at step 302. At step 304, the irrigation system 104 commences operation in accordance with a pre-determined irrigation program stored in the controller 106. In step 306, an amount of water runoff is detected by the sensor 102. In a typical embodiment, step 306 occurs simultaneously and continuously with step 304. That is, the sensor 102 detects water runoff at all times during operation of the irrigation system 104. In other embodiments, systems utilizing principals of the invention may detect water runoff at discrete intervals such as, for example, every five minutes, during irrigation.

Still referring to FIG. 3C, at step 308, the controller 106 determines if a flow rate detected by the sensor 102 exceeds a specified threshold. If, during step 308, the detected flow rate of runoff irrigation water is determined to not exceed the specified threshold, the process 300 progresses to step 309 and irrigation continues. On the other hand, if, during step 308, the detected flow rate is determined to exceed the specified threshold, the process 300 progresses to step 310. At step 310, the controller 106 signals the irrigation system 104 to cease irrigation. In a typical embodiment, cessation of irrigation at step 310 allows timed soaking of irrigation water into the yard 204. In step 312, an amount of water runoff is detected by the sensor 102. In a typical embodiment, step 312 occurs simultaneously and continuously with step 310. That is, the sensor 102 detects water runoff at all times during cessation of the irrigation system 104. In other embodiments, systems utilizing principals of the invention may detect water runoff at discrete intervals such as, for example, every five minutes, during cessation of irrigation. In such embodiments, a length of the discrete interval is dependent on several factors including, for example, soil filtration rate, slope, soil moisture, or other factors as dictated by design requirements.

Still referring to FIG. 3C, at step 314, the controller 106 determines if a flow rate of runoff irrigation water detected by the sensor 102 exceeds a specified threshold. If, during step 314, the detected flow rate is determined to not exceed the specified threshold, the process 300 progresses to step 309 and irrigation is resumed. On the other hand, if, during step 314, the detected flow rate is determined to exceed the specified threshold, the process 300 progresses to step 310 and irrigation continues to be ceased. In various embodiments, hysteresis of runoff water flow rates may be utilized to avoid undesirable cycling of the irrigation system 104. That is, in various embodiments, a first runoff water threshold could be utilized to cause cessation of the irrigation system 104 and a second, lower runoff water threshold could be utilized to determine when irrigation should be resumed. One skilled in the art will appreciate that the process 300 produces an irrigate-pause-irrigate pattern of irrigation. Such a pattern facilitates control of irrigation during periods when irrigation water is applied at a rate faster than can be absorbed by, for example, soil. In other embodiments, the controller 106 directs the irrigation system 104 to cease irrigation for a pre-determined period of time. At step 316, it is determined if a desired irrigation time has been achieved. If it is determined at step 316 that the desired irrigation time has been achieved, the process 300 ends at step 318. If it is determined at step 316 that the desired irrigation time has not been achieved, the process 300 returns to step 306.

Figure 4A:
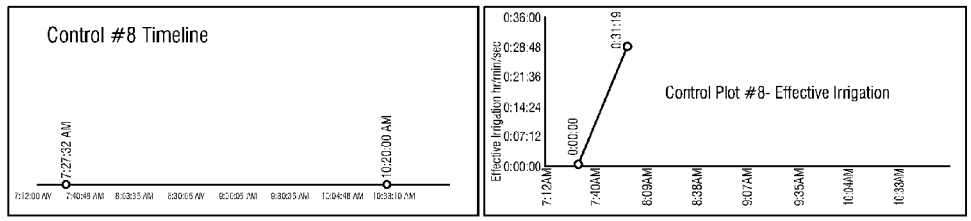
FIGS. 4A-4E are graphical depictions of experimental data associated with the irrigation runoff mitigation system according to an exemplary embodiment.
Figure 4B:
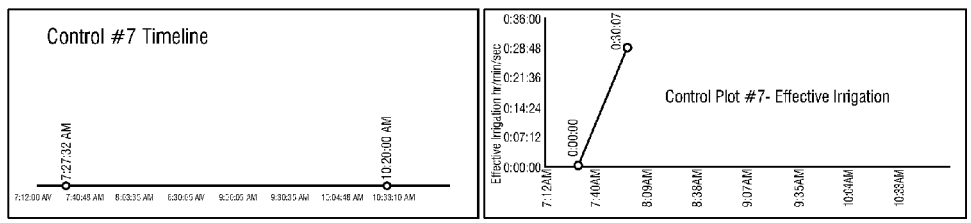
Figure 4C:
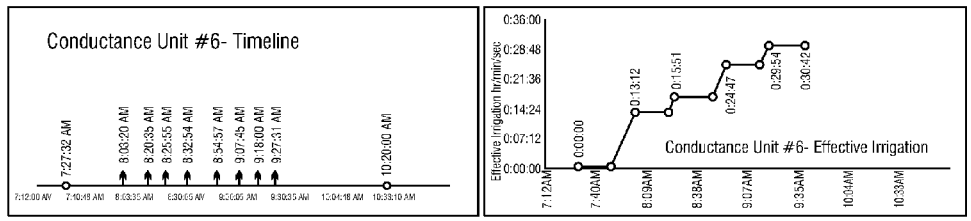
Figure 4D:
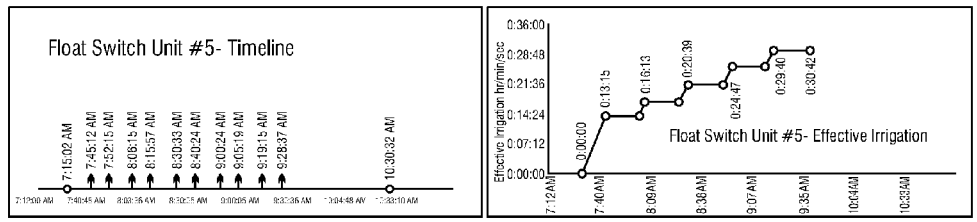
Figure 4E:
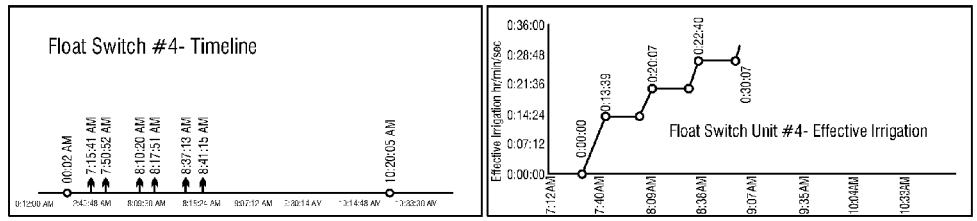

FIGS. 4A-4E are graphical depictions of experimental data associated with the irrigation runoff mitigation system 100. In an exemplary experimental application, a first irrigation system was programmed to run for 30 minutes utilizing a conventional controller. The first irrigation system ran un-interrupted for 30 minutes with visible runoff occurring at 12 minutes and continuing for the remainder of the 30-minute program. The first irrigation system is illustrated in FIGS. 4A-4B. In contrast, a second irrigation system was programmed to run for 30 minutes utilizing, for example, the irrigation runoff mitigation system 100. The second irrigation system ran for 12 minutes at which time runoff was detected. The second irrigation system then paused for 20 minutes and continued irrigation for another four-minute cycle at which time runoff was again detected. The second irrigation system continued in this fashion for three additional four-minute cycles. Such a pattern led to the second irrigation system applying irrigation with intermittent soaking over the course of 2.5 hours. The second irrigation system is illustrated in FIGS. 4C-4E.

Advantages of the present invention will be apparent to one skilled in the art. For example, the irrigation runoff mitigation system 100 facilitates stewardship of water resources and reduces off-site movement of irrigation water into, for example, storm water sewer systems or adjacent properties. The irrigation runoff mitigation system 100 also reduces loss of associated agricultural chemicals such as, for example, fertilizer, nutrients, and pesticides.

Field Testing Design and Methodology

Tests were performed to quantify the benefits of the irrigation runoff mitigation system 100 in terms of runoff reduction, irrigation water savings, soil wetting efficiency in landscape lawn plots. Tests were performed on two 13'×27' test plots exhibiting proximity to one another and similar runoff flow characteristics, as seen in earlier research. Plots included 3-year old 'Raleigh' St. Augustine grass of good quality and appearance. Plots were designed to simulate a typical front lawn of a home landscape. Underlying soil was a Boonville series (fine, smectitic, thermic, chromic vertic Albaqualf) fine-sandy loam on a 3.5% slope. Each plot was independently irrigated with an identical in-ground irrigation system design, with precipitation rate of 2" per hour. Runoff water from plots drained into collection gutters, which then flowed through H-flumes equipped with bubble flow meters for continuous measurement of runoff flow volumes from plots.

Figure 5:
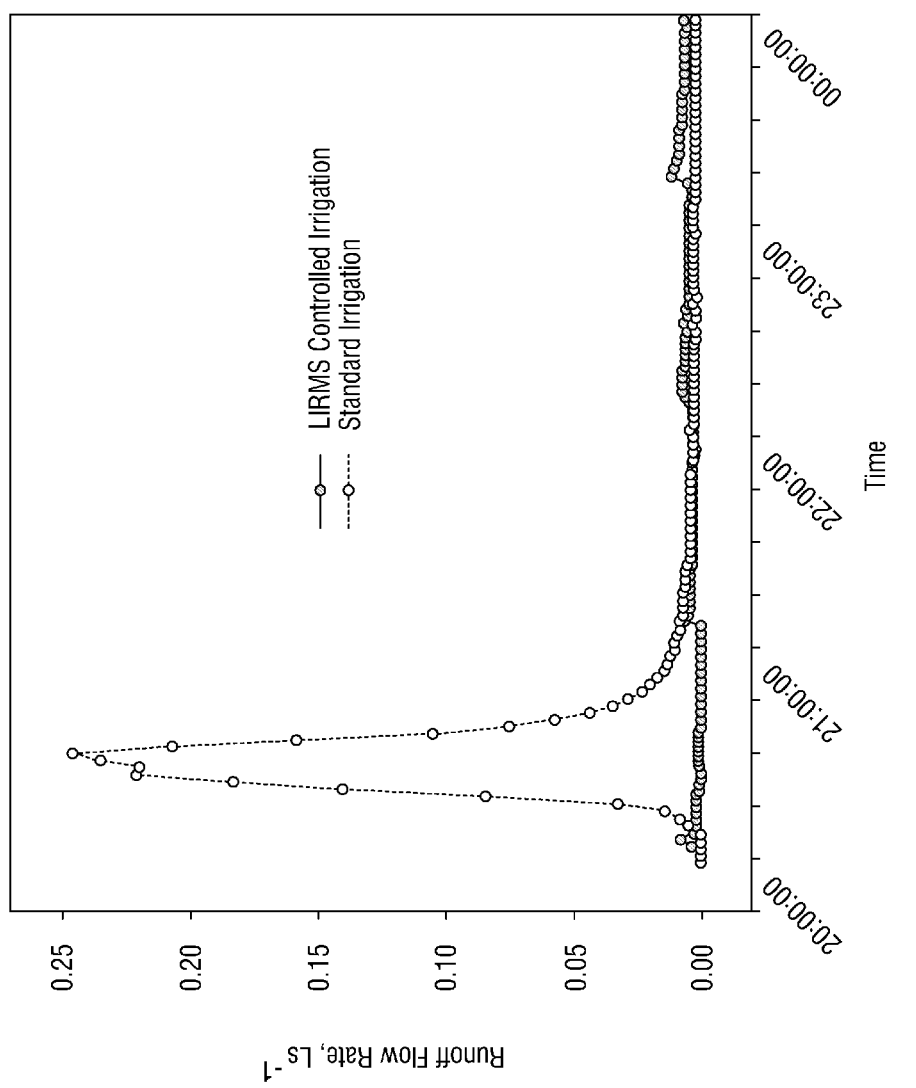
FIG. 5 is a plot of runoff flow rate versus time comparing standard irrigation to irrigation controlled by the irrigation runoff mitigation system of FIG. 1A according to an exemplary embodiment.

Two irrigation approaches were used in the test events. The first approach was an industry-standard single-irrigation application, referred to in FIGS. 5-7 as 'Control'. As such, for example, if a 30-minute irrigation application was programmed, the Control plots would irrigate for 30-minutes and then terminate. The other approach tested the irrigation runoff mitigation system 100, which was installed at the outflow from plots in order to sense and respond to runoff. While an equal (30-minute) amount of irrigation was programmed for the irrigation runoff mitigation system 100, the irrigation event would often be paused and restarted based on detection of runoff. Thus, for periods when soil was very wet at the initiation of the irrigation test, the irrigation runoff mitigation system 100 enters into numerous such as, for example, three to five, pause-restart cycles until the program is completed, or until a programmed allowable irrigation window (AIW) was exceeded.

As shown in FIG. 6, typical testing events compared the irrigation runoff mitigation system 100 to the Control plots in the context of a Scheduled Irrigation Time (SIT) of 30-minutes, which provided a 1" depth irrigation application. While multiple sensor types have been previously tested and shown to work well in the irrigation runoff mitigation system 100, conductivity and float mechanisms were utilized for these testing events. Pause Times of the irrigation runoff mitigation system 100 ranged from approximately 10 minutes to approximately 60 minutes. Pause Times of approximately 60 minutes allow for greater soil infiltration of water between runs of the irrigation runoff mitigation system 100. Testing was also performed in the early morning, so that wind and evaporation was minimized. The AIW ranged from approximately 6 hours to approximately 8 hours to accommodate greater pause times of the irrigation runoff mitigation system 100. In various embodiments, the AIW could be approximately 24 hours. Finally, Effective Irrigation Time (EIT) was also recorded. While EIT=SIT for control plots, the EIT≤SIT for tests utilizing the irrigation runoff mitigation system 100, especially during periods where prior rainfall caused soils to be saturated at the onset of irrigation, facilitating greater runoff and causing the irrigation runoff mitigation system 100 to pause multiple times and not fully complete the SIT. Finally, Total Operation Time (TOT) of the irrigation runoff mitigation system 100 was recorded for each event. TOT is the cumulative total amount of time the irrigation runoff mitigation system 100 operated, taking into account both irrigation and pause time during the AIW.

Data Collection and Results

Data collected during the testing events included irrigation volume applied (gallons), recorded using a totalizing flow meter installed at the irrigation valve of each plot. Flow meter readings were obtained the evening prior and immediately following each test event. While the Control and the irrigation runoff mitigation system 100 plots were each programmed to operate for 30-minutes, gallons applied sometimes differed slightly, due to differences in head performance and/or pressure between plots. Water Savings from the irrigation runoff mitigation system 100 was also calculated, where EIT<SIT. As shown in FIG. 6, qualitative runoff flow characteristics were evaluated, and cumulative total volumes were calculated for each event using, for example, Teledyne ISOC model 4230 bubbling flow meters at the base of each test plot. From these data, percent Runoff Reduction by the irrigation runoff mitigation system 100 was calculated as:

$$\text{Runoff Reduction (\%)} = (\text{Gallons Runoff}_{Control} - \text{Gallons Runoff}_{Test})/(\text{Gallons Runoff}_{Control})$$

Where Gallons Runoff$_{Test}$ refers to the volume of runoff water observed when using the irrigation runoff mitigation system 100. Soil Moisture (SM) was also measured as the volumetric water content of soil for the 0-2" soil depth. Four readings per plot were taken and averaged both Pre-test (4 pm afternoon prior to test event) and Post-test (noon the day of test event) using, for example, an SM200 soil moisture sensor available from Delta-T Devices LTD., Cambridge, UK. Based on the Soil Moisture Data, a Soil Wetting Efficiency Index (SWEI) was calculated for the irrigation runoff mitigation system 100 and the Control plots. SWEI represents the efficiency at which the soil was wetted per gallon of water applied during an irrigation test event, and was calculated by the following formula:

$$\text{SWEI} = [((SM_{post} - SM_{pre})/(SM_{pre})*1000]/(IV)$$

Where IV is irrigation volume in gallons, $SM_{post}$ is soil moisture at noon on the day of the test, and $SM_{pre}$ is soil moisture in the afternoon prior to the test.

Peak Flow Mitigation Potential

As shown in FIG. 6, during a typical irrigation test (30 minutes SIT), runoff of irrigation water from both the irrigation runoff mitigation system 100 and the Control plots begins to occur 10-12 minutes into the cycle. The irrigation runoff mitigation system 100 detects and responds to this runoff flow early on, minimizing peak flows during the irrigation event to less than 0.02 L s$^{-1}$ over the course of the pause-start cycles. Conversely, peak flow occurring from the Control plot rapidly approaches a maximum of 0.25 L s$^{-1}$, which is nearly 10 times the peak flow rate emanating from the irrigation runoff mitigation system 100 plots. From an environmental and resource conservation standpoint, the irrigation runoff mitigation system 100 demonstrates the potential to mitigate peak runoff irrigation water flow, which is beneficial in terms of reducing mass losses of soil, sediments, mulches, and fertilizers from landscape.

Runoff Reduction Potential

As shown in FIG. 7, testing data also demonstrate that the irrigation runoff mitigation system 100 is highly effective at reducing landscape runoff during irrigation events. Runoff reductions from use of the irrigation runoff mitigation system 100 ranged from approximately 37% to approximately 56%. Runoff reductions of 31% were noted when averaging across all testing dates in 2016. It has been shown that the irrigation runoff mitigation system 100 generally provided greatest runoff water reductions during wetter testing periods. Conversely, during drier periods, soils readily absorbed applied irrigation in both the irrigation runoff mitigation system 100 and the Control plots, thus reducing potential for runoff losses in either case.

Water Savings Potential

As a result of the use of the irrigation runoff mitigation system 100, gallons of irrigation water used was considerably reduced as a result of feedback control by the irrigation runoff mitigation system 100 when soils were saturated and could not accept irrigation water. When averaging across all tests, an average of 38 gallons per event was saved by use of the irrigation runoff mitigation system 100.

Soil Wetting Efficiency Potential

Compared to a standard single application, detection of runoff and irrigation control by the irrigation runoff mitigation system 100 resulted in much greater soil wetting efficiency (increase in soil moisture per gallon of water applied). As shown in FIG. 7, a SWEI was used to compare relative wetting efficiencies of the irrigation runoff mitigation system 100 vs. the Control plot irrigation approach. Based on the SWEI, use of the irrigation runoff mitigation system 100 resulted in an overall average 63% greater soil wetting efficiency. Greater soil wetting efficiency results in higher quality lawns and landscapes requiring less frequent irrigation events.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. An irrigation runoff mitigation system comprising:
   an irrigation system having at least one water outlet disposed in an irrigation zone, the irritation system comprising a valve fluidly coupled to the at least one water outlet
   a relay electrically coupled to the valve;
   a sensor that detects flow of runoff water through a boundary of the irrigation zone, the sensor being located at the boundary of the irrigation zone;
   a controller operatively coupled to the relay and to the sensor; and
   wherein, responsive to the sensor detecting a flow of water through the boundary above a first pre-defined threshold, the controller signals the relay to interrupt electrical current to the valve thereby causing the valve to close
   wherein, responsive to the sensor detecting a flow of water through the boundary below a second pre-defined threshold, the controller signals the relay to supply electrical current to the valve thereby causing the valve to open, the second pre-defined threshold being lower than the first pre-defined threshold.

2. The irrigation runoff mitigation system of claim 1, wherein the sensor is a paddle-wheel sensor.

3. The irrigation runoff mitigation system of claim 1, wherein the sensor is a float sensor.

4. The irrigation runoff mitigation system of claim 1, wherein the sensor is a conductivity sensor.

5. The irrigation runoff mitigation system of claim 1, wherein the controller produces an irrigate-pause-irrigate pattern.

6. The irrigation runoff mitigation system of claim 1, wherein pausing irrigation facilitates timed soaking of irrigation water into the irrigation zone.

7. The irrigation runoff mitigation system of claim 1, wherein the boundary is a street side curb.

8. The irrigation runoff mitigation system of claim 1, wherein the boundary is a landscaping edge.

9. The irrigation runoff mitigation system of claim 1, wherein the boundary is a drain line underlying an irrigation zone.

10. The irrigation runoff mitigation system of claim 1, wherein the boundary is a property boundary.

11. A method for mitigating irrigation runoff, the method comprising:
   applying irrigation water to an irrigation zone via an irrigation system having at least one water outlet disposed in the irrigation zone, the irrigation system comprising a valve fluidly coupled to the at least one water outlet and a relay electrically coupled to the valve;
   detecting, via a sensor, flow of runoff irrigation water through a boundary of the irrigation zone, the sensor being located at the boundary of the irrigation zone;
   pausing, via a controller, the applying irrigation water responsive to the detected runoff being above a first pre-defined threshold, the controller being operatively coupled to the relay and to the sensor;
   timing, via the controller, soaking of irrigation water into the irrigation zone; and
   resuming, via the controller, the applying irrigation water responsive to the detected runoff being below a second pre-defined threshold, the second pre-defined threshold being lower than the first pre-defined threshold.

12. The method of claim 11, wherein the pausing the applying irrigation water and the resuming the applying irrigation water produces a repeatable irrigate-pause-irrigate pattern.

13. The method of claim 11, wherein the pausing the applying irrigation water and the resuming the applying irrigation water continues until a desired irrigation time has been reached.

14. The method of claim 11, wherein the pausing the applying irrigation water and the resuming the applying irrigation water continues until an allowable irrigation window of time is exceeded.

15. The method of claim 14, wherein the allowable irrigation window of time is in a range of approximately 6 hours to approximately 24 hours.

16. A method for mitigating irrigation runoff, the method comprising:
- applying irrigation water to an irrigation zone via an irrigation system having at least one water outlet disposed in the irrigation zone, the irrigation system comprising a valve fluidly coupled to the at least one water outlet and a relay electrically coupled to the valve;
- detecting, via a sensor, flow of runoff irrigation water through a boundary of the irrigation zone, the sensor being located at the boundary of the irrigation zone;
- pausing, via a controller, the applying irrigation water responsive to the detected runoff being above a predefined threshold, the controller being operatively coupled to the relay and to the sensor; and
- timing, via the controller, soaking of irrigation water into the irrigation zone.

17. The method of claim 16, wherein the applying irrigation water flushes salt from the irrigation zone.

* * * * *